US008899746B2

(12) United States Patent
Back

(10) Patent No.: US 8,899,746 B2
(45) Date of Patent: Dec. 2, 2014

(54) CONTACT LENS SETS AND METHODS TO PREVENT OR SLOW PROGRESSION OF MYOPIA OR HYPEROPIA

(75) Inventor: Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 217 days.

(21) Appl. No.: 13/318,630

(22) PCT Filed: May 3, 2010

(86) PCT No.: PCT/US2010/033416
§ 371 (c)(1),
(2), (4) Date: Mar. 14, 2012

(87) PCT Pub. No.: WO2011/049642
PCT Pub. Date: Apr. 28, 2011

(65) Prior Publication Data
US 2012/0194780 A1    Aug. 2, 2012

Related U.S. Application Data

(60) Provisional application No. 61/253,861, filed on Oct. 22, 2009.

(51) Int. Cl.
*G02C 7/04*    (2006.01)

(52) U.S. Cl.
CPC ............... *G02C 7/041* (2013.01); *G02C 7/042* (2013.01); *G02C 2202/24* (2013.01)
USPC .................. 351/159.78; 351/159.79

(58) Field of Classification Search
CPC .............................. G02C 7/04; G02C 2202/24
USPC ........................................ 359/159.73–159.79
See application file for complete search history.

(56) References Cited

U.S. PATENT DOCUMENTS 4,199,231 A    4/1980    Evans
4,420,228 A    12/1983    Humphrey
(Continued)

FOREIGN PATENT DOCUMENTS

CN    1089825 A    7/1994
CN    1420380 A    5/2003
(Continued)

OTHER PUBLICATIONS

International Search Report and Written Opinion of the International Searching Authority issued in corresponding International Patent Application No. PCT/US2010/033416 dated Aug. 17, 2010 (12 pages).

(Continued)

*Primary Examiner* — Scott J Sugarman
(74) *Attorney, Agent, or Firm* — Kilyk & Bowersox, P.L.L.C.

(57) ABSTRACT

Methods for slowing progression of myopia or hyperopia of human patients include a step of providing contact lenses. The contact lenses have two or more refractive powers. A first refractive power provides clear visual acuity and a second refractive power provides a defocused retinal image to the human patient. The methods involve providing first and second sets of the contact lenses, the contact lenses of the second set have a different optical design than the contact lenses of the first set. With the present methods, an eye care practitioner is able to select one or more contact lenses from the second set of contact lenses based on one or more ocular parameters of the patient, one or more responses of the patient to the contact lens of the first set, or both, to provide an improved clinical benefit to the patient compared to the benefit provided by the first set of contact lenses.

16 Claims, 7 Drawing Sheets

(56) References Cited

U.S. PATENT DOCUMENTS

| | | |
|---|---|---|
| 5,404,183 A | 4/1995 | Seidner |
| 5,485,228 A | 1/1996 | Roffman et al. |
| 5,517,259 A | 5/1996 | Blum et al. |
| 5,528,321 A | 6/1996 | Blum et al. |
| 5,541,678 A | 7/1996 | Awanohara et al. |
| 5,875,019 A | 2/1999 | Villani |
| 5,988,813 A | 11/1999 | Neadle et al. |
| 6,305,802 B1 | 10/2001 | Roffman et al. |
| 6,364,483 B1 | 4/2002 | Grossinger et al. |
| 6,652,095 B2 | 11/2003 | Tung |
| 6,709,102 B2 | 3/2004 | Duppstadt |
| 6,752,499 B2 | 6/2004 | Aller |
| 6,926,406 B2 | 8/2005 | Mitsui |
| 7,025,460 B2 | 4/2006 | Smitth et al. |
| 7,216,977 B2 | 5/2007 | Poulain et al. |
| 7,287,853 B2 | 10/2007 | Toshima et al. |
| 7,540,610 B2 | 6/2009 | Carimalo et al. |
| 7,832,859 B2 * | 11/2010 | Phillips ................ 351/159.1 |
| 7,862,171 B2 | 1/2011 | Varnas et al. |
| 8,672,473 B2 * | 3/2014 | Martinez et al. ......... 351/159.05 |
| 2002/0149742 A1 | 10/2002 | Back |
| 2003/0058407 A1 | 3/2003 | Aller |
| 2003/0088313 A1 | 5/2003 | Nigam |
| 2004/0085515 A1 | 5/2004 | Roffman et al. |
| 2005/0041202 A1 | 2/2005 | Jubin et al. |
| 2005/0218536 A1 | 10/2005 | Quinn et al. |
| 2005/0237482 A1 | 10/2005 | Jubin et al. |
| 2007/0019155 A1 | 1/2007 | Back |
| 2007/0035052 A1 | 2/2007 | Goodenough et al. |
| 2007/0122450 A1 | 5/2007 | Osio Sancho |
| 2007/0296916 A1 | 12/2007 | Holden et al. |
| 2008/0218687 A1 | 9/2008 | Phillips |
| 2008/0291393 A1 | 11/2008 | Menezes |
| 2009/0257026 A1 | 10/2009 | Varnas et al. |
| 2010/0270693 A1 | 10/2010 | Goodenough et al. |
| 2012/0113386 A1 | 5/2012 | Back |
| 2012/0113388 A1 | 5/2012 | Back |
| 2012/0176582 A1 | 7/2012 | Back et al. |
| 2012/0213922 A1 | 8/2012 | Quinn et al. |

FOREIGN PATENT DOCUMENTS

| | | |
|---|---|---|
| CN | 1672085 A | 9/2005 |
| EP | 2028528 A1 | 2/2009 |
| FR | 2871247 A1 | 12/2005 |
| JP | 2002515132 A | 5/2002 |
| JP | 2003524206 A | 8/2003 |
| JP | 2007511803 | 5/2007 |
| WO | 9314434 A1 | 7/1993 |
| WO | 9616621 A1 | 6/1996 |
| WO | 9726580 A1 | 7/1997 |
| WO | 01/47449 A1 | 7/2001 |
| WO | 0163344 A1 | 8/2001 |
| WO | 2005019907 A1 | 3/2005 |
| WO | 2005055891 A1 | 6/2005 |
| WO | 2005098478 A1 | 10/2005 |
| WO | 2007021597 A2 | 2/2007 |
| WO | 200741796 A1 | 4/2007 |
| WO | 2007146673 A2 | 12/2007 |
| WO | 2008111856 A1 | 9/2008 |
| WO | 2008131479 A1 | 11/2008 |
| WO | 2008144497 A1 | 11/2008 |
| WO | 2009052570 A1 | 4/2009 |
| WO | 2009129528 A1 | 10/2009 |

OTHER PUBLICATIONS

International Preliminary Report on Patentability issued in corresponding International Patent Application No. PCT/US2010/033416 dated Oct. 19, 2011 (14 pages).

Supplementary European Search Report issued in corresponding European Patent Application No. 10 82 5342 dated Feb. 24, 2012 (3 pages).

Office Action received in corresponding Chinese Patent Application No. 201080026152.9 dated Oct. 30, 2012 (3 pages).

Cheng et al., "The effect of positive-lens addition and base-in prism on accommodation accuracy and near horizontal phoria in Chinese myopic children," Ophthal. Physiol. Opt., 2008, vol. 28, pp. 225-237.

Anstice et al., "Accommodative status of children enrolled in the DIMENZ trial (dual-focus inhibition of myopia evaluation in New Zealand)," Ophthal. Physiol. Opt., 2006, vol. 26 (Suppl. 1), (Section F041 at pp. 35-36), pp. 1-67.

Wallman et al., "Homeostasis of Eye Growth and the Question of Myopia," Neuron, vol. 43, pp. 447-468, Aug. 19, 2004.

Manny et al., "Accommodative Lag by Autorefraction and Two Dynamic Retinoscopy Methods," Optom. Vis Sci., 86.3 (2009): 233-243.

Cheng, Desmond, "Bifocal Lens Control of Myopia Progression in Children," PhD Thesis, School of Optometry, Queensland University of Technology, Brisbane, Australia, 2008, 143 pages.

Seidemann et al., "An evaluation of the lag of accommodation using photorefraction," Vision Research, vol. 43, No. 4, Feb. 1, 2003, pp. 419-430.

Chung et al., "Near esophoria is associated with high myopia," Clinical and Experimental Optometry, vol. 83, No. 2, Mar. 1, 2000, pp. 71-75 (5 pages).

Office Action received in U.S. Appl. No. 13/318,406 dated Jun. 11, 2014 (17 pages).

Office Action received in U.S. Appl. No. 13/318,625 dated Jun. 25, 2013 (19 pages).

Office Action received in U.S. Appl. No. 13/318,625 dated Jan. 17, 2014 (17 pages).

Office Action received in U.S. Appl. No. 13/318,625 dated Aug. 7, 2014 (12 pages).

Office Action received in U.S. Appl. No. 13/318,433 dated Aug. 1, 2013 (13 pages).

* cited by examiner

CONTACT LENS SETS AND METHODS TO PREVENT OR SLOW PROGRESSION OF MYOPIA OR HYPEROPIA This application is a National Stage Application of PCT/US2010/033416, filed May 3, 2010, and which claims the benefit under 35 U.S.C. §119(e) of prior U.S. Provisional Patent Application No. 61/253,861, filed Oct. 22, 2009, which is incorporated in its entirety by reference herein.

FIELD

The present invention relates to contact lenses and methods. More specifically, methods for preventing or slowing progression of myopia or hyperopia include the use of two or more sets of contact lenses that have different optical designs, but contact lenses from each set provide defocused retinal images to human patients to prevent or slow progression of myopia or hyperopia.

BACKGROUND

Myopia, or near-sightedness, affects a substantial proportion of the world's population, especially in some Asian countries. Myopia is typically associated with an abnormal elongation of a person's eyeball. The elongated eyeball results in the retina being located out of the "normal" focal plane such that distant objects are focused in front of the retina rather than on the plane of the retina. The elongated eyeball associated with more severe myopia can also be associated with retinal detachment, glaucomatous damage and degenerative myopic retinopathy.

Efforts for reducing the progression of myopia have been attempted and include using multifocal spectacle or contact lenses, using lenses which affect optical aberrations, reshaping the cornea, and using pharmacological agents. Some ophthalmic lenses have been described for reducing progression of myopia that include a vision correction area that provides clear vision at near and distant viewing distances and a myopic defocus area that provides a defocused image at near and distant viewing distances. Difficulties associated with some of the proposed attempts at reducing myopia progression include pharmaceutical side effects, discomfort, compromised vision, or combinations thereof.

Contact lenses which provide both a focused retinal image during distance and near viewing, and a myopic defocused retinal image simultaneously to the eye(s) of a contact lens wearer during both near and distance viewing have been previously described for preventing or slowing the progression of myopia, for example, in U.S. Patent Application Publication No. US 20080062380, CONTACT LENSES AND METHODS FOR PREVENTION OF MYOPIA PROGRESSION, and in U.S. Patent Application Publication No. US 20080218687, CONTACT LENSES AND METHOD, each of which is hereby incorporated by reference in its entirety. These lenses have been found to be effective in correcting myopia and slowing its progression in many contact lens wearers, and can also be used to correct cases of hyperopia and to slow its progression.

SUMMARY

Methods for slowing progression of myopia or hyperopia of human patients include a step of providing contact lenses. The contact lenses can be provided from a contact lens manufacturer to a contact lens distributor, a contact lens retailer, or an eye care practitioner, from an eye care practitioner to a patient, or any combination thereof. Each contact lens has two or more refractive powers. A first refractive power provides clear visual acuity and a second refractive power provides a defocused retinal image to the human patient. The defocused retinal image can be either a myopic defocused retinal image or a hyperopic defocused retinal image. The methods involve providing first and second sets of the contact lenses, the contact lenses of the second set have a different optical design than the contact lenses of the first set. With the present methods, an eye care practitioner is able to select one or more contact lenses from the second set of contact lenses based on one or more ocular parameters of the patient, one or more responses of the patient to the contact lens of the first set, or both, to provide an improved clinical benefit to the patient compared to the benefit provided by the first set of contact lenses. As used herein, improved clinical benefit refers to a clinical effect that is perceived by a patient or eye care practitioner to be better under a test condition compared to a clinical effect under a control condition.

Although the contact lenses described in US 20080218687 are effective in slowing progression of myopia in many contact lens wearers, it has been discovered that a significant number of contact lens wearers do not satisfactorily respond to the treatment provided by these contact lenses. For example, in these contact lens wearers, the contact lenses do not provide the same level of effectiveness of correcting or slowing the progression of myopia compared to other contact lens wearers, in which the contact lenses provide effective reduction in myopia progression. As described herein, the present methods and sets of contact lenses can be effective in reducing or eliminating progression of myopia in contact lens wearers who do not satisfactorily respond to the effects provided by the contact lenses described in US 20080218687. The present methods and sets of contact lenses can be effective in reducing or eliminating progression of hyperopia in contact lens wearers who do not satisfactorily respond to the effects provided by contact lenses intended to reduce progression of hyperopia.

The contact lenses described in US 20080218687 include a vision correction region, which is effective in providing a clear retinal image at both far and near viewing distances, and a myopic defocus region, which is effective in providing a myopic defocused image simultaneously at both far and near viewing distances in patients who are capable of ocular accommodation. These contact lenses can be referred to as myopic defocus contact lenses for purposes of convenience herein. In particular, the myopic defocus contact lenses described include a central circular zone and one or more concentric rings circumscribing the central circular zone. The vision correction region and the myopic defocus region are defined by the central circular zone and the concentric rings in various combinations, as described therein.

Thus, for a myopic defocus contact lens which prevents or slows the progression of myopia, where the contact lens simultaneously provides a contact lens wearer with a myopic defocused retinal image and with a focused retinal image, it has been discovered that a number of factors can affect the contact lens wearer's response to the treatment provided by the contact lens. These factors include the pupil size of the contact lens wearer, the central zone diameter of the contact lens, the ratio of the area of a myopic defocus region to the area of a vision correction region of the contact lens., or combinations thereof. The discovery of the relationship between these parameters and treatment results provides means for altering treatment outcomes by varying contact lens parameters, by selecting a lens from a set of lenses with varied contact lens parameters, or both.

In practicing the present methods, sets of contact lenses are provided. At least a first set and a second set is provided. More than two sets of contact lenses can be provided. Each set of contact lenses includes two or more contact lenses. In other words, a set of contact lenses comprises a first contact lens and a second contact lens. As used herein, a set may also include more than two contact lenses, e.g., three contact lenses, four contact lenses, five contact lenses, etc. The contact lenses of the first set and the contact lenses of the second set have different lens designs or different design dimensions, or both. Thus, if a contact lens wearer in need of treatment doesn't satisfactorily respond to the treatment provided by a contact lens of the first contact lens set, a contact lens of the second contact lens set is provided to obtain a more effective treatment. For example, in certain lens designs for reducing progression of myopia, the percentage of lens wearers or patients who show no noticeable effect in reduction of myopia progression is about 25%. It has been discovered that there may be a correlation between effect and pupil size. Alternatively, if a contact lens wearer in need of treatment finds the level of treatment provided by the contact lens of the first set to be too great, a contact lens of the second contact lens set may be provided to obtain a lower level of treatment which is still effective. In addition, by selecting a lens from the second contact lens set to provide a lower level of treatment, it is possible to provide improved vision or improved visual acuity to enable the lens wearer to continue wearing the lenses while being provided some treatment benefits.

Additionally, if the contact lens wearer doesn't satisfactorily respond to the contact lens of the second contact lens set, or is predicted by an eye care practitioner to not respond as desired to the effects provided by the contact lens of the second contact lens set, another contact lens may be provided by another set of contact lenses having different optical designs than the contact lenses of the first and second contact lens sets.

It can be appreciated that another aspect of the present invention relates to sets of contact lenses, as described herein.

In another aspect, the invention is directed to a method of providing a set of contact lenses. The methods comprise manufacturing a set of at least two contact lenses as described in the preceding paragraph, or in which the contact lens parameters of central zone diameter, area ratio, optical design, power profile, or power distribution, or any combinations thereof, are varied for each of the at least two lenses in the set. The methods also comprise a step of providing the set to an eye care practitioner in a manner such that a practitioner can select at least one contact lens from among the set of contact lenses to provide to a contact lens wearer.

In another aspect, the invention is directed to a method of prescribing a contact lens. The methods comprise the steps of determining a contact lens wearer's pupil size, and selecting at least one contact lens for the wearer based on the wearer's pupil size. Additional or alternative methods may comprise a step of determining a contact lens wearer's accommodation response or determining a contact lens wearer's visual response, or both.

In a broad aspect, the invention is directed to a method of using a set of at least two contact lenses.

Additional aspects of the present invention are also described by the appended claims.

Various embodiments of the present invention are described in detail in the detailed description below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and claims.

DETAILED DESCRIPTION

Figure 1:
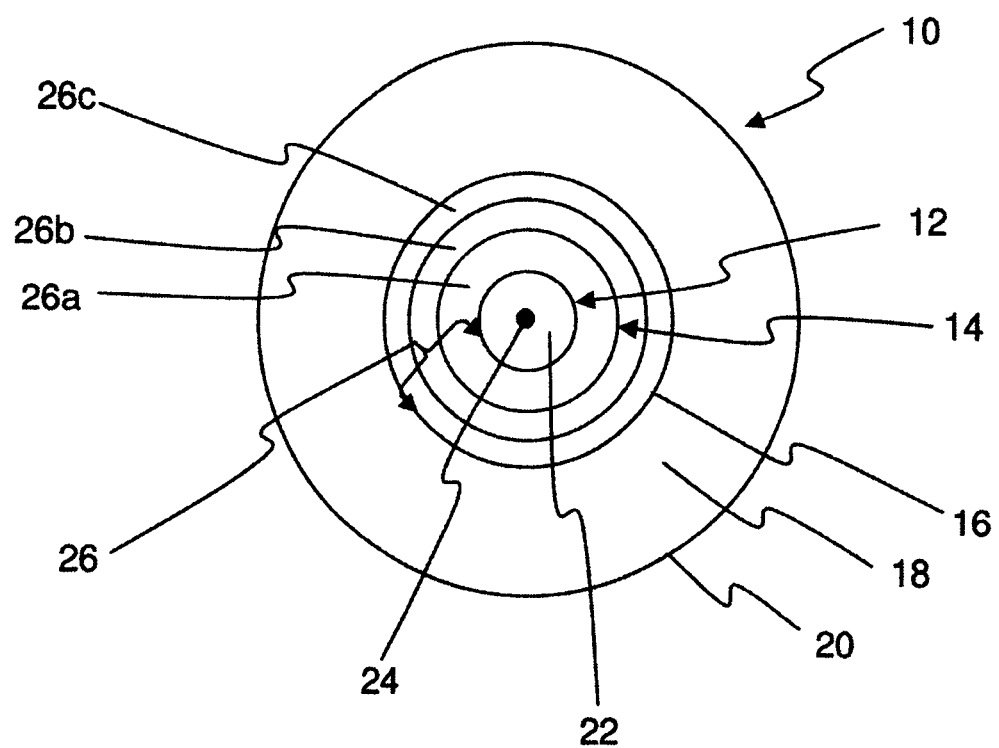
FIG. 1 is a front plan view of an example of a contact lens of the present lens sets and methods.

In general, an aspect of the present invention relates to methods. More specifically, this aspect of the invention relates to methods that may be used by contact lens manufacturers, contact lens suppliers, or contact lens distributors, or any combinations thereof. The methods may be practiced by eye care practitioners. For example, a method of the present invention may comprise a step of providing contact lenses to an eye care practitioner by a contact lens manufacturer, a contact lens supplier, or a contact lens distributor. The methods may be practiced by contact lens wearers, such as when the methods involve placing a contact lens on a lens wearer's eye.

As described herein, the methods of the present invention relate to slowing progression of myopia or hyperopia in human patients. As described further, a method for slowing progression of myopia or hyperopia of a human patient comprises a step of providing contact lenses. The method can comprise one or more additional steps in addition to the providing step, as described herein.

The contact lenses that are provided in the present methods comprise a first set of contact lenses and a second set of contact lenses. The contact lenses are provided so that an eye care practitioner (ECP) can select a contact lens from the second set of contact lenses based on an ocular parameter of the patient, a response of the patient to a contact lens of the first set of contact lenses, and/or an ocular measurement through an ophthalmic lens, or any combinations thereof. For example, the contact lens of the second set of contact lenses can be selected based on the contact lens wearer's corneal curvature, corneal diameter, pupil size, lag of accommodation, loss of contrast, poor reading performance on tests (such as MN read), contact lens diameter, levels of ghosting, and/or peripheral refraction, or any combinations thereof. The contact lens from the second set of contact lenses is selected to provide an improved visual performance to a human patient wearing the second set of contact lenses compared to the visual performance of the human patient provided by the first set of contact lenses.

In the foregoing methods, the first set of contact lenses comprises at least two contact lenses. For example, the first set of contact lenses can comprise, consist essentially of, or consist of, two contact lenses, three contact lenses, four contact lenses, five contact lenses, six contact lenses, twelve contact lenses, thirty contact lenses, ninety contact lenses, or any number greater than or equal to two contact lenses. Each contact lens of the first set of contact lenses comprises a first refractive power and a second refractive power. The second refractive power is different than the first refractive power.

The second refractive power provides a defocused retinal image to a human patient at both near and far viewing distances when the contact lens is placed on the eye of the human patient, such as by the contact lens wearer placing the lens on his or her own eye. The first refractive power of the contact lenses of the first set of contact lenses can be minus, such as from −0.25 to −20.00 diopters; plano, such as 0.00 diopters; or plus, such as +0.25 to +20.00 diopters. The contact lenses can also include cylinder refractive powers, as provided on existing toric contact lenses for correcting astigmatism.

In addition and in the foregoing methods, the second set of contact lenses comprises at least two contact lenses. The second set of contact lenses can comprise at least two identical contact lenses. For example, the second set of contact lenses can comprise, consist essentially of, or consist of, two contact lenses, three contact lenses, four contact lenses, five contact lenses, six contact lenses, twelve contact lenses, thirty contact lenses, ninety contact lenses, or any number greater than or equal to two contact lenses. Each contact lens of the second set of contact lenses comprises a first refractive power and a second refractive power. The second refractive power is different than the first refractive power. The second refractive power provides a defocused retinal image to a human patient at both near and far viewing distances when the contact lens is placed on the eye of the human patient, such as by the contact lens wearer placing the lens on his or her own eye. The defocused retinal image, such as a myopic defocused retinal image (i.e., a focal plane anterior to the retina of the lens wearer's eye) or a hyperopic defocused retinal image (i.e., a focal plane posterior to the retina of the lens wearer's eye), is effective in slowing progression of myopia or hyperopia of the human patient. For example, with lenses in which the second refractive power provides a myopic defocused image, the lenses are effective in slowing progression of myopia of the human patient. Similarly, with lenses in which the second refractive power provides a hyperopic defocused image, the lenses are effective in slowing progression of hyperopia. The contact lenses of the second set of contact lenses have a different optical design than the contact lenses of the first set. The first and second refractive powers of the contact lenses of the second set may be the same or different from the first and second refractive powers of the contact lenses of the first set, respectively.

Unlike contact lenses that are described as providing only off-axis peripheral defocus, and not on-axis defocus, the contact lenses of the present sets of contact lenses can provide on-axis defocus to a patient's eye(s). In other words, the second refractive power of the contact lenses of the first set, or the contact lenses of the second set, or both, can provide either a myopic defocused image or a hyperopic defocused image along the central visual axis of the eye or at the fovea of the patient's eye(s). The present contact lenses can also provide a defocused retinal image at more peripheral retinal locations than the fovea, such as defocus at 30 degrees (incident), or even less than 30 degrees (incident), such as 20 degrees, or 10 degrees, or 5 degrees.

The contact lens of the second set of contact lenses can be selected if the human patient exhibits a greater than 25% increase in progression of refractive error per year on an annualized basis, or if the human patient exhibits an increase in refractive error greater than 0.25 diopters per year on an annualized basis, whichever is greater, after wearing contact lenses of the first set for an amount of time specified by the eye care practitioner.

For purposes of express disclosure, an aspect of the present invention may also be understood to be: a method, comprising a step of providing contact lenses, the contact lenses comprising a first set of contact lenses and a second set of contact lenses, so that a practitioner can select a contact lens from the second set of contact lenses based on an ocular parameter of the patient, a response of the patient to a contact lens of the first set of contact lenses, and/or an ocular measurement through an ophthalmic lens, or any combinations thereof, to provide an improved visual performance to a human patient wearing the second set of contact lenses compared to the visual performance of the human patient provided by the first set of contact lenses; wherein the first set of contact lenses comprises at least two contact lenses, each contact lens comprising a first refractive power and a second refractive power, the second refractive power providing a defocused retinal image to a human patient at both near and far viewing distances when the contact lens is placed on the eye of the human patient, and wherein the second set of contact lenses comprises at least two contact lenses, each contact lens comprising a first refractive power and a second refractive power, the second refractive power providing a defocused retinal image to a human patient at both near and far viewing distances when the contact lens is placed on the eye of the human patient and effective to slow progression of myopia or hyperopia of the human patient, and the contact lenses of the second set have a different optical design than the contact lenses of the first set.

Thus, in view of the foregoing, it can be understood that the present methods comprise providing two or more sets of contact lenses to ultimately permit an eye care practitioner to select one or more contact lenses from a second set of contact lenses having a different optical design than the other set(s) of contact lenses to provide improved visual performance to the human patient or an improved visual response of the human patient compared to the visual performance provided by one of the other sets of contact lenses.

In the foregoing methods, the providing step can comprise providing the contact lenses from a contact lens manufacturer to a contact lens distributor, a contact lens retailer, or an eye care practitioner, or any combinations thereof. For example, in one method, the contact lenses are provided from a contact lens manufacturer to a contact lens distributor. In another method, the contact lenses can be provided from a contact lens manufacturer to a contact lens retailer. In another method, the contact lenses can be provided from a contact lens manufacturer to an eye care practitioner. In yet another method, the contact lenses can be provided from a contact lens distributor to an eye care practitioner. In each of these foregoing methods, the eye care practitioner is not practicing the steps of the method, and thus, the methods are not methods of medical treatment.

In any of the foregoing methods, the present invention can further comprise an additional step of providing contact lenses to a human patient for the human patient to place the contact lenses on his or her own eyes. For example, the contact lenses can be provided by a contact lens manufacturer, a contact lens distributor, a contact lens retailer, or even an eye care practitioner directly to the human patient (i.e., the contact lens wearer). The patient, after receiving the contact lenses, is then responsible for placing the contact lenses on his or her own eyes to provide treatment to reduce progression of myopia or hyperopia.

In any of the foregoing methods, the method may comprise an additional step of prescribing the second set of contact lenses to the human patient. The step of prescribing the contact lenses can be performed by a contact lens prescriber. In many situations, the contact lens prescriber will be the eye care practitioner described above.

In any of the foregoing methods, the contact lens from the second set of contact lenses may be selected based on a degree of distance refractive error of the patient, a pupil size of the patient, visual acuity of the patient, accommodative lag of the patient, fixation disparity of the patient, a phoria of the patient, an ocular wavefront aberration profile of the patient, a peripheral refraction of the patient, and/or an axial length measurement of the patient, or any combinations thereof. These measurements are well understood in the clinical field of ophthalmology, optometry, and by eye care practitioners, and are determined using conventional equipment and methods. An eye care practitioner can thus determine the change of prescription, change in axial length of the patient's eyeball, change in peripheral refraction, change in accommodative lag, change in vision response, and/or change in pupil size, or any combinations thereof.

Any clinically acceptable criteria can be chosen by an eye care practitioner to determine whether a contact lens or contact lenses of a second set of contact lenses should be selected based on the results from wearing the contact lens of the first set. For example, vision measurements, such as high contrast high luminance visual acuity, low contrast high luminance visual acuity, ghosting (at either distance, intermediate, or near viewing distances), and/or stereopsis, can be measured by the eye care practitioner.

A contact lens of the second set of contact lenses can be selected if the visual acuity (either high contrast or low contrast) changes more than 0.5 lines (0.05 log MAR) from baseline, which is determined with the patient wearing a single vision spectacle lens or a single vision contact lens. As used herein, MAR refers to Minimum Angle Resolution, as understood by eye care practitioners.

A contact lens of the second set of contact lenses can be selected if the amount of ghosting changes more than 10 points from baseline using a one hundred point scale, where the baseline is determined with the patient wearing a single vision spectacle lens or a single vision contact lens.

A contact lens of the second set of contact lenses can be selected if the amount of stereopsis changes more than ten seconds of arc from baseline, where the baseline is determined with the patient wearing a single vision spectacle lens or a single vision contact lens at 40 cm.

Other criteria useful by eye care practitioners in the decision process to select a contact lens from the second set include measurements of myopia progression.

A contact lens of the second set of contact lenses can be selected if the amount of refractive error changes by at least −0.25 diopters or more on an annualized basis. Or, a contact lens of the second set of contact lenses can be selected after the amount of refractive error changes by at least −0.25 diopters or more on an annualized basis.

A contact lens of the second set of contact lenses can be selected if the ocular axial length changes by 0.10 mm or more on an annualized basis. Or, a contact lens of the second set of contact lenses can be selected after the ocular axial length changes by 0.10 mm or more on an annualized basis.

Another criteria useful by eye care practitioners in the decision process to select a contact lens from the second set includes accommodative error measurements. For example, a contact lens of the second set of contact lenses can be selected if the accommodative lag increases by 0.25 diopters or more from the baseline, where the baseline is determined with the patient wearing a single vision spectacle lens or a single vision contact lens. Or, for example, a contact lens of the second set of contact lenses can be selected after the accommodative lag increases by 0.25 diopters or more from the baseline, where the baseline is determined with the patient wearing a single vision spectacle lens or a single vision contact lens Another criteria useful by eye care practitioners in the decision process to select a contact lens from the second set includes peripheral defocus measurements. For example, a contact lens of the second set of contact lenses can be selected if the peripheral defocus caused by the contact lens of the first set is less than 0.25 diopters myopic defocus.

Another criteria useful by eye care practitioners in the decision process to select a contact lens from the second set includes reading performance. For example, the eye care practitioner can determine the MN read maximum reading speed or the MN read reading acuity, and can select a contact lens from the second set of contact lenses if the reading speed changes by more than 0.5 second from baseline, or if the reading acuity changes by more than 0.5 lines from baseline, where the baseline is determined with the patient wearing a single vision spectacle lens or single vision contact lens.

Another criteria useful by eye care practitioners in the decision process to select a contact lens from the second set includes lens fit. For example, an eye care practitioner can measure visual stability, lens movement, corneal coverage, centration, and/or lens tightness (as determined using a conventional push-up test), or any combinations thereof. A contact lens of the second set of contact lenses can be selected if, when wearing the contact lens of the first set of contact lenses, the patient's vision fluctuates upon blinking, the lens does not move sufficiently on the eye, the corneal coverage by the lens of the first set is less than 100%, the lens of the first set is associated with decentration of more than 0.05 mm in any direction, or if the lens of the first set is clinically too loose or clinically too tight.

In any of the foregoing methods, the improved visual performance provided by the second set of contact lenses comprises improved vision, improved visual acuity, improved visual quality, and/or improved slowing of progression of myopia or hyperopia in patients who do not exhibit a slowing of progression of myopia or hyperopia when wearing the first set of contact lenses, or any combinations thereof. The improved visual performance can be understood to be a minimum noticeable improvement in vision of the patient as determined by an eye care practitioner. Methods and equipment for determining improvements in visual performance are understood by persons of ordinary skill in the art.

In the foregoing methods, the improved visual acuity comprises a reduction in ghosting or an increase in contrast visual acuity, or any combinations thereof. A reduction in ghosting at distance, intermediate, or near viewing distances, can be defined as a change of more than ten points from a baseline score using a one hundred point scale (the baseline score can be based on a patient wearing a single vision spectacle lens or a single vision contact lens). An increase in contrast visual acuity can be determined using high contrast high luminance, low contrast high luminance, or both. An increase in contrast visual acuity can be defined as a change of more than 0.5 lines (0.05 log MAR) from baseline, where the baseline is determined when the patient is wearing a single vision spectacle lens or a single vision contact lens).

In any of the foregoing methods described above, the contact lenses can be provided so that an eye care practitioner can select a contact lens from the second set of contact lenses based on an ocular parameter of the patient, and the ocular parameter is measured before wearing a contact lens of the first set, or after wearing a contact lens of the first set. The ocular parameter can be a pupil size, ocular shape, accommodative lag, and/or peripheral refraction. The measurement of these ocular parameters can be performed using conventional equipment and methods, as understood by eye care practitioners. For example, a contact lens can be selected from the second set of contact lenses where the amount of defocus provided by the contact lens of the first set is less than 0.75 diopters, or if the peripheral refraction with the first set of contact lenses is not demonstrating myopic defocus. Alternatively, the contact lenses are provided so that an eye care practitioner can select a contact lens from the second set of contact lenses based on a response of the patient to a contact lens of the first set of contact lenses after at least 10 minutes of wearing the contact lens of the first set of contact lenses. For example, in a clinical setting, a patient may wear a contact lens of the first set for 10 minutes or more during a single visit, and the patient may then be evaluated by the eye care practitioner for undesirable responses suggestive of a better response to a contact lens of a different optical design. For example, the eye care practitioner may measure visual acuity, accommodative error, and the like, and determine that a contact lens from a second set of contact lenses will likely provide improved visual performance. In a further embodiment, the response of the patient to the first set of contact lenses is measures after at least 6 months of wearing the contact lens of the first set. These responses may be related to clinical effects that typically take longer to occur than the time of a visit to an eye care practitioner. Or, the responses may be related to lens fit, such that a contact lens having a different basecurve, lens diameter, or lens thickness is selected to provide a better fitting on the lens wearer. An improved lens fit can be determined using conventional equipment and techniques as understood by eye care practitioners and can include improved lens centration, improved lens movement, or both, so that the patient's vision improves as a result of the better fitting provided by the different lens parameters of the contact lens or lenses of the second contact lens set. Thus, the response of the patient measured by the eye care practitioner can comprise an accommodative response, an axial ocular elongation measurement, and/or a refractive error correction progression measurement, or any combinations thereof The responses measured in the present methods can be measured in one eye, can be measured in both eyes at different times, or can be simultaneously measured in both eyes.

The present methods may also comprise a step of providing instructions instructing the eye care practitioner on methods of selecting an appropriate lens for a contact lens wearer from the set of lenses. The instructions can be provided with the lens sets or can be provided independently or separately from the lens sets.

The present methods may also comprise steps of: determining a contact lens wearer's approximate pupil size; and selecting at least one contact lens for the contact lens wearer based on the pupil size so determined.

In any of the foregoing methods, the second refractive power of a contact lens of the first set of contact lenses can define a first defocus region and the second refractive power of a contact lens of the second set of contact lens defines a second defocus region. The second defocus region has a different location of the lens, a different size, a different shape, a different dioptric value, a different transition between regions, and/or a different number of regions, or any combinations thereof, compared to the first defocus region.

In additional embodiments and in any of the foregoing methods, the first refractive power of a contact lens of the first set of contact lenses defines a first vision correction region and the second refractive power of the contact lens of the first set of contact lenses defines a first defocus region, and the first refractive power of a contact lens of the second set of contact lenses defines a second vision correction region and the second refractive power of the contact lens of the second set of contact lenses defines a second defocus region. The contact lens of the second set of contact lenses has a different area ratio of the second vision correction region to the second defocus region compared to the area ratio of the first vision correction region to the first defocus region. As used herein, each of the first refractive powers and the second refractive powers are provided in discrete regions of the contact lenses such that the areas of each of the regions can be measured or quantified. The lenses of the present methods have a vision correction area (corresponding to the sum of the area(s) of the vision correction region(s)) and a defocus area (corresponding to the sum of the area(s) of the defocus region(s)). Comparing the vision correction area to the defocus area provides an area ratio. As described above, the area ratio between the vision correction region and the defocus region is different for the contact lens of the second set compared to the area ratio of the contact lens of the first set. The area ratio can be greater or the area ratio can be less. For example, if the area ratio of the vision correction area to the defocus area of the first set of contact lenses is 50/50 (e.g., 1:1), the area ratio of the vision correction area to the defocus are of the second set of contact lenses can be 70/30, which would be effective to reduce ghosting for the portion of the contact lens that covers the pupil.

In any of the foregoing methods, a contact lens of the first set of contact lenses and a contact lens of the second set of contact lenses can each have an optical axis. The optical axis generally corresponds to the geometric center of the contact lens. Each of the contact lenses comprises (i) a central zone that includes the optical axis, provides the first refractive power of each lens, and has a central zone diameter; and (ii) an annular zone adjacent to and circumscribing the central zone, and providing the second refractive power of the contact lens. The central zone diameter of the contact lens of the second set is less than the central zone diameter of the contact lens of the first set.

The contact lenses provided with the present methods can be soft contact lenses, rigid contact lenses, or hybrid contact lenses, as understood by persons of ordinary skill in the art. Preferably, the contact lenses provided in the present methods are soft contact lenses. As used herein, soft contact lenses have a flexibility to substantially conform to the shape of an eye of a lens wearer when placed on the lens wearer's eye. A soft contact lens is also able to be folded without breaking. Typically, soft contact lenses are referred to as hydrogel contact lenses, as compared to rigid gas permeable contact lenses. As used herein, a hydrogel contact lens refers to a polymeric lens that has the ability to absorb and retain water in an equilibrium state. In the context of the present description, a hydrogel lens can be polymeric material that is free of a silicone-containing component, or a hydrogel lens can be a polymeric material that includes a silicone-containing component. Many silicone-free hydrogel contact lenses are based on polymerizable lens formulations that include hydroxyethyl methacrylate (HEMA) monomers. Some examples of hydrogel contact lens materials include materials having the following US Adopted Names (USANs): etafilcon A, nelfilcon A, ocufilcon A, ocufilcon B, ocufilcon C, ocufilcon D, and omafilcon A. In addition, the present contact lenses may be hydrogel contact lenses that are based on lens formulations that contain glyceryl methacrylate (GMA) alone or in combination with HEMA. Silicone-containing hydrogel contact lenses are frequently referred to as silicone hydrogel contact lenses. Many silicone hydrogel contact lenses are based on polymerizable lens formulations that include siloxane monomers, oligomers, or macromers. Some examples of silicone hydrogel contact lens materials include materials having the following USANs: acquafilcon A or aquafilcon A, balafilcon A, comfilcon A, enfilcon A, galyfilcon A, lenefilcon A, lotrafilcon A, lotrafilcon B, narafilcon A, and senofilcon A.

The present contact lenses may be the polymerized reaction product of a polymerizable composition that comprises one or more hydrophilic monomers, one or more hydrophobic monomers, one or more silicone-containing monomers, oligomers, or macromers, one or more polymers, or any combinations thereof. The polymerizable compositions used to make the present lenses may include crosslinking agents, free radical initiators, tinting agents, UV absorbers, and the like. The present soft contact lenses may comprise, consist essentially of, or consist of, any of the foregoing contact lens materials identified by the USAN names above. The present lenses can be made from omafilcon A. The present lenses can be silicone hydrogel contact lenses such as ones made from comfilcon A or enfilcon A.

The present contact lenses can be molded contact lenses, such as spin-cast molded or cast molded contact lenses, or lathed contact lenses. It can be appreciated that these types of contact lenses can have different physical features resulting from their method of manufacture. A cast molded contact lens refers to a contact lens obtained from a contact lens mold assembly formed from two contact lens mold sections in contact with each other to form a contact lens shaped cavity. In addition, a portion of the present contact lenses can be polished or smoothed after forming the contact lens. For example, a contact lens that has been cast molded or lathed, or both, can be polished to reduce transition areas or improve edge shapes to provide greater comfort compared to unpolished lenses.

The present contact lenses can be daily wear lenses or extended wear lenses. As used herein, an extended wear contact lens refers to a contact lens that is approved for wearing on a continuous basis for more than 24 hours. Each contact lens of the lens pair can be a daily disposable contact lens (i.e., a contact lens that is worn on a person's eye only once and then discarded without cleaning the lens). In comparison, as understood by persons of ordinary skill in the art, a daily wear lens is a lens that is worn on a person's eye, and is then cleaned and is worn on the person's eye for at least one additional time. It can be appreciated that daily disposable contact lenses can be physically different or chemically different, or both compared to daily wear and extended wear contact lenses. For example, formulations used to make daily wear or extended wear contact lenses are different than formulations used to make daily disposable contact lenses due to the economic and commercial factors in making substantially larger volumes of daily disposable contact lenses.

The contact lenses provided by practicing the present methods can be manufactured by a cast molding process as follows. A polymerizable composition of lens forming ingredients is prepared and dispensed onto a female contact lens mold section having a concave surface for forming the front surface of the contact lens. A male contact lens mold section having a convex surface for forming the rear surface of the contact lens is then placed adjacent to the female contact lens mold section to form a contact lens mold assembly. The contact lens mold assembly containing the polymerizable composition can then be exposed to heat, visible light, ultraviolet light, or other forms of radiation to polymerize the polymerizable composition and form a polymerized contact lens product. The mold assembly is then separated to provide the polymerized contact lens product on either the male or female mold section. The polymerized contact lens product is then separated from the male or female mold section to produce a delensed contact lens product. The delensed contact lens product is placed in a contact lens package, such as a plastic blister pack or a glass vial. In the package, the contact lens is provided in a contact lens packaging solution. The package is then closed and sterilized to produce a packaged contact lens. Optionally, the delensed contact lens product can be washed to remove extractable materials from the delensed contact lens product prior to closing the package. The washing can occur within the package or can occur in a separate washing station. The packaged contact lens can then be placed in a secondary package, such as a box or container, along with other packaged contact lenses. The packaged contact lenses, typically provided in the secondary packaging, can then be provided in accordance with the present methods.

In view of the disclosure herein, it can be understood that the present methods may also comprise a step of manufacturing the contact lenses. The manufacturing step can comprise, consist essentially of, or consist of any of the foregoing manufacturing steps described in the preceding paragraph. After manufacturing the contact lenses, the contact lenses can be provided in accordance with the present methods.

The first and second refractive powers, as well as other refractive powers if provided, are present in the optic zone of the contact lenses. As used herein, the optic zone refers to a portion of the contact lens that overlaps the pupil of the eye. Typically, the optic zone is circular and has a diameter less than 9 mm. If the contact lens includes a toric optic zone for correcting astigmatism, the diameter of the major axis of the toric optic zone is typically less than 11 mm. The diameter of the optic zone can be from about 3 mm to 11 mm. The optic zone of the contact lens is circumscribed by a peripheral zone. The border between the optic zone and the peripheral zone is visually identifiable with the naked eye, a magnifying instrument, or with a lens inspecting device, such as a zonometer, or is measurable using a power profiling interferometer, such as a Fizeau interferometer. Thus, in the context of the present description, the clear visual acuity and the defocus is provided by the first and second refractive powers provided by the optic zone of the contact lens. It can be appreciated that one or more transition regions or surfaces can be provided at the border of the optic zone and the peripheral zone or between regions having the first refractive power and second refractive power. The transition regions have a surface curvature that may be of a different curvature than the adjacent regions, and they are effective in reducing discontinuities between the different areas. A difference in the dimensions and power profile of a transition region of a contact lens is sufficient to define such contact lenses as a different set of contact lenses. In addition, contact lenses may be provided with a distinct separate region that includes one or more additional regions that provide defocus, and can thus be considered to have multiple defocus regions.

As an example, a contact lens of the contact lenses provided in the present methods comprises a central circular zone and one or more circumscribing rings surrounding the central circular zone. Because the optical design of the contact lens of the second set is different than the optical design of the contact lens of the first set, the central zone diameter, the size of the region or regions with the first refractive power, and/or the size of the region or regions with the second refractive power, or both, vary between lenses of the first set and lenses of the second set. It can be appreciated, as used herein, that different optical design refers to lenses that may have vision correction zones with similar shapes and different dimensions, as well as vision correction zones with different shapes and similar dimensions, as well as a different number of zones.

The first refractive power of the contact lens can be zero diopters or a negative diopter. When the lens wearer is myopic, the first refractive power is selected to correct the patient's distance visual acuity of the eye and this zone is also used for near vision taking into account the patient's ability to accommodate. Thus, the first refractive power of the contact lens can be understood to be a distance optical power, a distance power, or a distance vision power. The first refractive power can be from 0.00 diopters to −10.00 diopters. The first refractive power of the present lenses is provided in one or more regions of the contact lens, that is the region(s) having the first refractive power, is/are structured (sized, shaped, or both sized and shaped) to provide clear vision to the patient at both near and far viewing distances. The first refractive power of the contact lens can be provided by a spherical lens surface curvature, an aspherical lens surface curvature, or any combinations thereof. As used herein, the first refractive power may appear to be an effective single refractive power. That is, the first refractive power of the contact lens, when measured by a vertometer or focimeter, as used in contact lens manufacturing environments, may appear as a single refractive power. However, the first refractive power may also be provided by an aspheric surface or surfaces that provide more than one refractive power to the contact lens, but where the lens still has an effective single refractive power.

As used herein, a near distance refers to a viewing distance in which the target being viewed is about 60 cm or less from the patient. The viewing distance may also be referred to as a target distance. Frequently, near visual acuity is measured at about 40 cm. As used herein, a far distance refers to a viewing distance or target distance in which the target being viewed is at least 400 cm. Examples of far viewing distances include at least 400 cm, at least 500 cm, and at least 600 cm. As used herein, an intermediate viewing distance refers to a distance between a near viewing distance and a far viewing distance. For example, an intermediate viewing distance refers to a distance greater than 60 cm to less than 400 cm, and includes as an example, about 80 cm, about 100 cm, about 120 cm, and about 140 cm.

In view of the above, it can be understood that the first refractive power of the present contact lenses has a refractive power that provides clear vision to the patient at target distances less than about 60 cm, and at distances from about 400 cm to infinity. The present contact lenses also provide clear vision to the patient at intermediate target or viewing distances.

The second refractive power that provides either myopic or hyperopic defocus has a refractive power that is different than the refractive power of the vision correction region. The second refractive power provided by the contact lens is effective in providing a defocused image while the human patient is simultaneously provided with clear visual acuity by the first refractive power, at both near viewing distances and far viewing distances. As stated above, myopic defocus refers to a defocused image formed in front of the retina, in part or totally, by the contact lens when the contact lens is located on the eye of the human patient. The myopic defocus can be understood to be positive in that the defocused image created by the contact lens is located anterior to the retina of the eye upon which the contact lens is acting.

When myopic defocus is provided by the second refractive power, the second refractive power is less negative than the first refractive power of the contact lens. The second refractive power of the contact lens can be a negative diopter, zero diopters, or a positive diopter. For example, if the power of the vision correction region is −10.0 diopters, the refractive power of the myopic defocus region can be about −9.0 diopters, about −8.0 diopters, about −7.0 diopters, about −6.0 diopters, about −5.0 diopters, about −4.0 diopters, about −3.0 diopters, about −2.0 diopters, about −1.0 diopters, or about 0 diopters, or even about +1.0 diopters or about +2.0 diopters. The first refractive power can be from about 0 diopters to about −10.0 diopters, and the second refractive power is about 2.0 diopters less negative than the first refractive power. As one example, a contact lens can have a first refractive power of +1.00 diopters, and a second refractive power of −1.00 diopters.

Importantly, since the patient provided with the present contact lens or contact lenses uses the first refractive power to see clearly at near and far distances (due to accommodation by the patient's eye), the second refractive power is not used by the patient to provide clear vision at near distances (in contrast to the near vision zone of commercially available bifocal contact lenses) and instead, the second refractive power is effective in providing a defocused image to the patient simultaneously with a clear image at both near and far distances.

The first refractive power or the second refractive power, or both, can each comprise, consist essentially of, or consist of a single region, as described herein. Alternatively, the first refractive power or the second refractive power, or both, can comprise, consist essentially of, or consist of a plurality of sub-regions, as described herein.

For purposes of illustration, FIG. 1 illustrates an example of a contact lens that can be provided in the present methods. The lens 10 has a vision correction region 12 and a myopic defocus region 14. The vision correction region 12 has a first refractive power and the myopic defocus region 14 has a second refractive power, as described herein. The vision correction region 12 and the myopic defocus region 14 define an optic zone 16 of the lens 10, and as described herein. The optic zone 16 is circumscribed by a non-optical peripheral zone 18 which extends from an outer perimeter of the optic zone 16 to a peripheral edge zone 20 of the lens 10.

In the contact lens 10 illustrated in FIG. 1, the vision correction region 12 comprises a central zone 22. As described herein, central zone 22 has a distance optical power. Central zone 22 is centered about the optical axis 24 of the lens 10. Central zone 22 is illustrated as being circular or substantially circular. The central zone of the contact lens can have a diameter greater than 2.0 mm. The diameter of the central zone 22 can be determined by measuring a straight line through the optic axis 24 to opposing perimeter boundaries of the central zone 22 in a two-dimensional front plan view of the contact lens. The contact lens can comprise a central zone 22 having a distance optical power and a diameter of at least 2.3 mm. The contact lens can comprise a central zone 22 having a distance optical power and a diameter of at least 2.5 mm. The contact lens can comprise a central zone 22 having a distance optical power and a diameter of at least 3.3 mm. The contact lens can comprise a central zone 22 having a distance optical power and a diameter greater than 4.0 mm.

The lens 10 illustrated in FIG. 1 can also be understood to comprise an annular ring region 26 circumscribing the central circular zone 22. The annular region 26 can be a region of a single refractive power such that it appears as a single ring when viewed with optical instruments, or it can be a region having multiple refractive powers such that the annular region 26 appears to have a plurality of sub-rings. In the example illustrated in FIG. 1, the annular region 26 comprises, consists essentially of, or consists of a plurality of concentrically arranged sub-rings 26a, 26b, and 26c. It can thus be understood then that in a contact lens provided in the present methods, the contact lens may comprise a myopic defocus region that comprises, consists essentially of, or consists of a first annular region, such as ring 26a, adjacent to and circumscribing the circular central zone 22. Alternatively or in addition, a contact lens as shown in FIG. 1 comprises an annular region 26 circumscribing the central circular zone 22, and the annular region comprises a plurality of annular concentrically arranged sub-rings 26a, 26b, and 26c, at least one of the sub-rings, such as sub-ring 26a, being a portion of the myopic defocus region 14, and at least one of the sub-rings, such as sub-ring 26b, being a portion of the vision correction region 12. For the purposes of the present disclosure, a sub-ring is a portion of the vision correction region 12 or the myopic defocus region 14 if the sub-ring has a refractive power that is similar or the same as the refractive power of the vision correction region 12 or the refractive power of the myopic defocus region 14, respectively. As used herein, the term "similar" corresponds to or resembles, and can be understood to be identical except for minor differences, such as a variation of plus or minus ten percent or within 0.25 diopters. In the illustrated example of FIG. 1, the lens 10 comprises sub-ring 26c, which is a portion of the myopic defocus region 14.

Figure 2A:
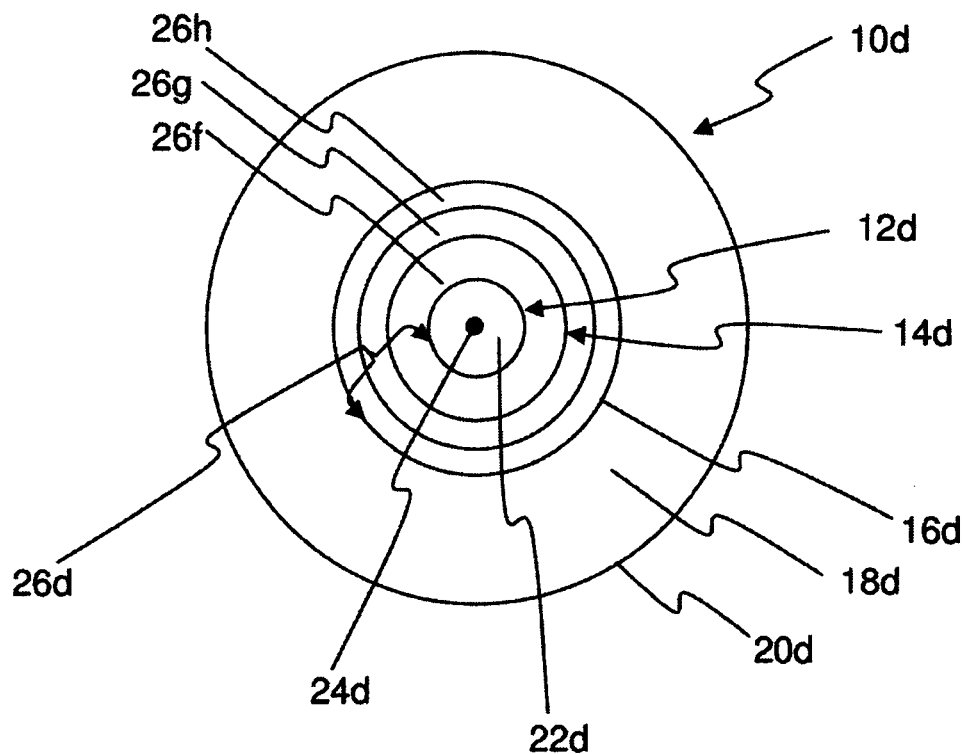
FIGS. 2A and 2B are front plan views of an example of a set of contact lens according to the present lens sets and as used in the present methods.
Figure 2B:
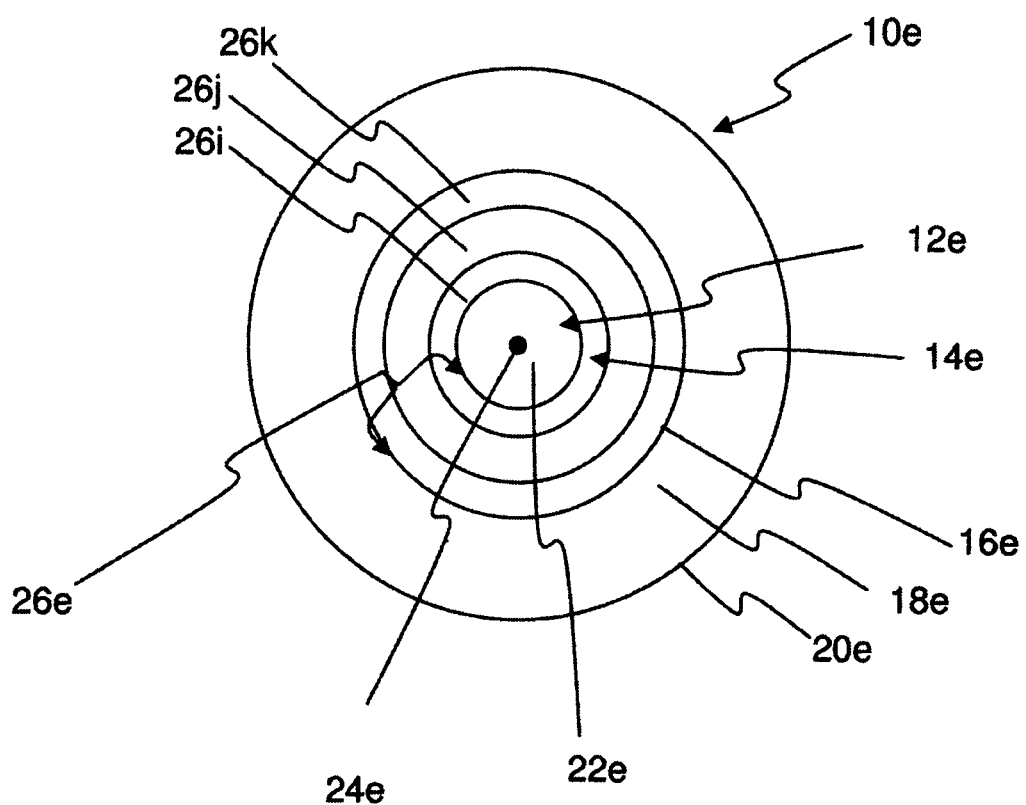

FIGS. 2A and 2B illustrate an example of a set of two contact lenses. The first lens 10d (FIG. 2A) has a clear vision region 12d having a first refractive power and a defocus region 14d having a second refractive power. As understood herein, a vision correction region and clear vision region are used interchangeably. For example, a plano vision correction region can be understood to be a clear vision region for a patient requiring no spherical refractive correction. The clear vision region 12d and the defocus region 14d define an optic zone 16d of the lens 10d. The optic zone 16d is circumscribed by a non-optical peripheral zone 18d which extends from an outer perimeter of the optic zone 16d to a peripheral edge zone 20d of the lens 10d. Similarly, the second lens 10e (FIG. 2B) has a clear vision region 12e and a defocus region 14e. The clear vision region 12e and the defocus region 14e define an optic zone 16e of the lens 10e. The optic zone 16e is circumscribed by a non-optical peripheral zone 18e which extends from an outer perimeter of the optic zone 16e to a peripheral edge zone 20e of the lens 10e.

In the set of two contact lens 10d and 10e illustrated in FIGS. 2A and 2B, the clear vision regions 12d and 12e each comprises central primary zones 22d and 22e. As described herein, each of the primary zones 22d and 22e has a distance optical power which can be the same as or different from that of another contact lens in the set. Alternatively, each of the primary zones 22d and 22e can have a near optical power which can be the same as or different from that of another contact lens in the set. Primary zone 22d is centered about the optical axis 24d of the lens 10e; primary zone 22e is centered about the optical axis 24e of the lens 10e (FIG. 2B). Both primary zones 22d and 22e are illustrated as being circular or substantially circular. In the present methods, the primary zone 22 of at least one of the contact lenses in the set can have a diameter greater than 2.0 mm. Since the diameter of the optic zones of the present contact lenses are typically less than about 9.0 mm, the maximum diameter of the primary zone(s) is less than 9.0 mm. The primary zone diameters may be greater than 2.0 mm and less than 7.0 mm. As an example, the primary zone diameter may be greater than 3.0 mm and less than 6.0 mm.

At least one contact lens in the set can comprise a primary zone 22 having a distance optical power and a diameter of at least 2.3 mm. At least one contact lens in the set can comprise a primary zone 22 having a distance optical power and a diameter of at least 2.5 mm. At least one contact lens in the set can comprise a primary zone 22 having a distance optical power and a diameter of at least 3.3 mm. At least one contact lens in the set can comprise a primary zone 22 having a distance optical power and a diameter greater than 4.0 mm.

At least one contact lens in the set can comprise a primary zone 22 having a near optical power and a diameter of at least 2.3 mm. At least one contact lens in the set can comprise a primary zone 22 having a near optical power and a diameter of at least 2.5 mm. At least one contact lens in the set can comprise a primary zone 22 having a near optical power and a diameter of at least 3.3 mm. At least one contact lens in the set can comprise a primary zone 22 having a near optical power and a diameter greater than 4.0 mm.

The lenses 10d and 10e illustrated in FIGS. 2A and 2B can also be understood to comprise annular areas 26d and 26e circumscribing the circular primary zones 22d and 22e. The annular areas 26d or 26e can be an area of a single refractive power such that it appears as a single ring when viewed with optical instruments, or it can be an area having multiple refractive powers such that the annular area 26d or 26e appears to have a plurality of sub-rings. In the example illustrated in FIGS. 2A and 2B, both lenses 10e (FIG. 2B)and 10d (FIG. 2A) comprise lenses with annular areas 26d and 26e, where the annular areas 26d and 26e comprises, includes, consists essentially of, or consists of a plurality of concentrically arranged sub-rings 26f, 26g, and 26h; and 26i, 26j, and 26k, respectively. In lenses 10d and 10e of FIGS. 2A-2B, the sub-rings are shown to have different diameters and/or areas. It can thus be understood then that in a contact lens set of the present invention, at least one of the contact lenses in the set may comprise a defocus region that comprises, includes consists essentially of, or consists of a secondary zone which is a annular area, such as ring 26f, adjacent to and circumscribing the circular primary zone 22. Alternatively or in addition, at least one contact lens of the set as shown in FIGS. 2A and 2B comprises an annular area 26f circumscribing the primary zone 22d, and the annular area comprises a plurality of concentrically arranged sub-rings 26f, 26g, and 26h, with sub-ring 26f, comprising the secondary zone of the lens, sub-ring 26g comprising the tertiary zone of the lens, and sub-ring 26h comprising the quaternary zone of the lens In the illustrated example of FIGS. 2A and 2B, the secondary zone of lens 10d (FIG. 2A) comprises sub-ring 26h, which is a portion of the myopic defocus region 14d.

Figure 3A:
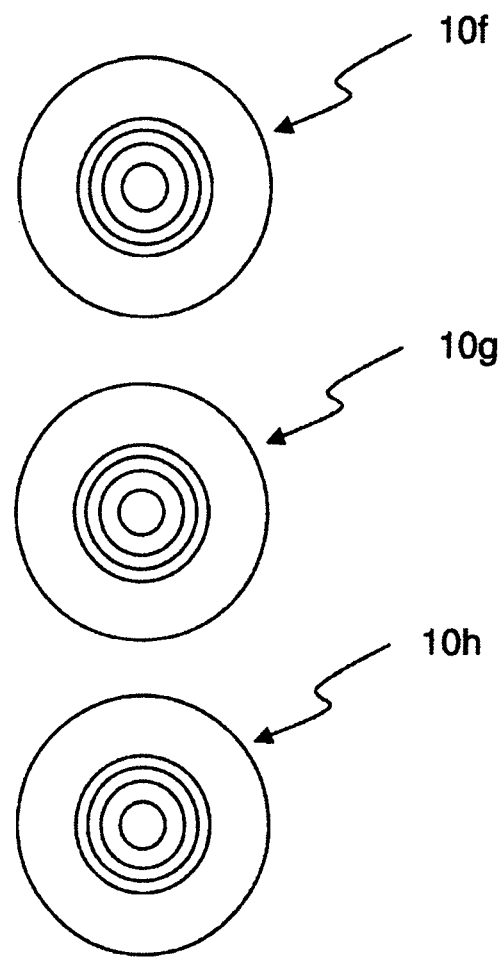
FIGS. 3A-3D are front plan views of another example of sets of contact lenses used in the present methods.
Figure 3B:
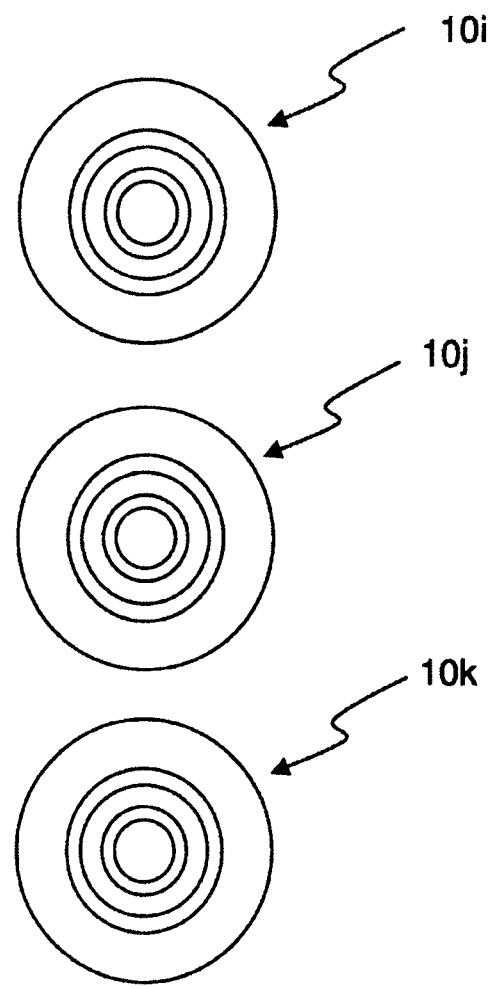
Figure 3C:
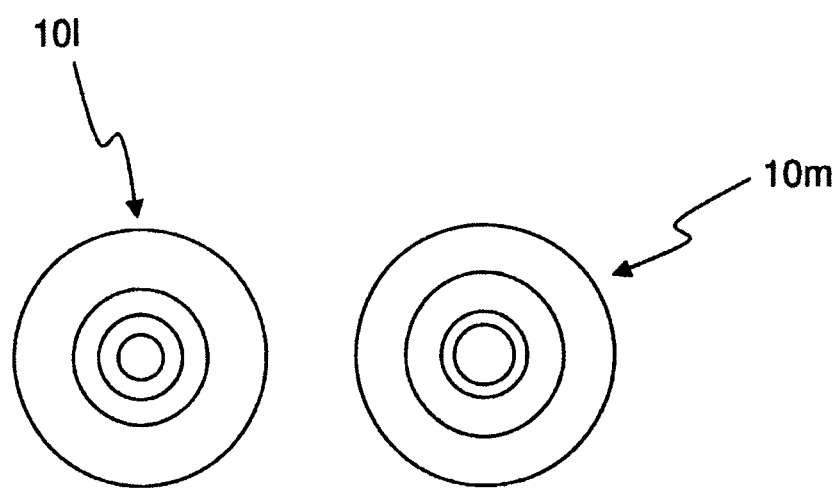
Figure 3D:
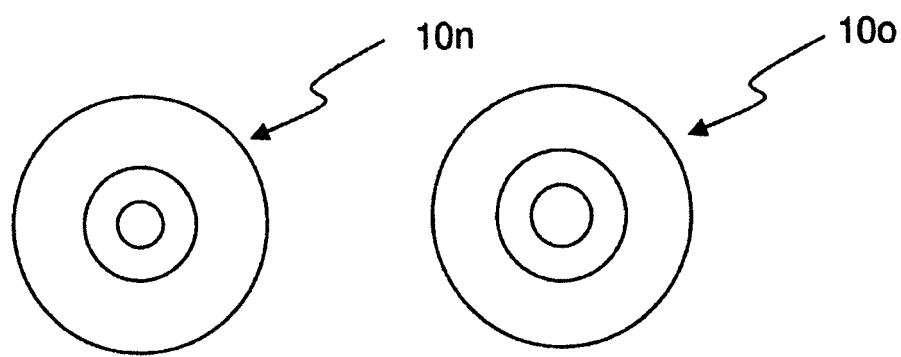

FIGS. 3A-3D are illustrations of other examples of sets of contact lenses according to the present lens sets and as used in the present methods. In FIGS. 3A-3D, ten individual lenses are illustrated: lens 10f, lens 10g, lens 10h (FIG. 3A), lens 10i, lens 10j, lens 10k (FIG. 3B), lens 10l, lens 10m (FIG. 3C), and lens 10n, lens 10o (FIG. 3D). In these illustrations, each of the lenses 10f, 10g, and 10h (FIG. 3A), 10i, 10j and 10k (FIG. 3B) comprise an optic zone comprised of a primary zone, a secondary zone, a tertiary zone and a quaternary zone, wherein the optic zone is circumscribed by a peripheral zone. Lens 10l and lens 10m (FIG. 3C) do not have a quaternary zone. Lens 10n and lens 10o (FIG. 3D) do not have a tertiary zone or a quaternary zone. In this illustration, the shape, size, dimension, and location of the primary, secondary, tertiary and quaternary zones of lenses 10f, 10g, and 10h (FIG. 3A) are substantially the same (e.g., the contact lenses 10f, 10g, and 10h have zones that are of similar shape and dimensions). Similarly, in this illustration, the shape, size, dimension, and location of the primary, secondary, tertiary and quaternary zones of lenses 10i, 10j, and 10k (FIG. 3B) are substantially the same (e.g., the contact lenses 10i, 10j, and 10k have zones that are of similar shape and dimensions). The lenses 10f, 10g, and 10h (FIG. 3A) define a first set of contact lenses, and the lenses 10i, 10j, and 10k (FIG. 3B) define a second set of contact lenses, wherein the contact lenses of the second set of contact lenses have a different optical design compared to the contact lenses of the first set. In particular, as illustrated, the diameter of the central zone is greater in the contact lenses of the second set. In addition, the width of the individual rings of the lenses of the second set differ from the width of the corresponding rings of the lenses of the first set. Similarly, lenses 10l and 10m (FIG. 3C), and 10n and 10o (FIG. 3D) can represent another set of contact lenses having a different number of rings compared to the lenses described above, and different optical zone dimension. By changing the number of rings in the contact lens, as illustrated, it is possible to generate different contrast images among the different lens sets to and provide better vision improvement to the patient.

In another example, with respect to the lenses illustrated in FIGS. 3A-3D, a set of at least two lenses in accordance with the present invention can comprise lenses 10f and 10i; a set of two lenses each with different lens designs. An example can be a set of two lenses wherein the set further include lenses 10g and 10j, wherein lens 10g is a substantially duplicate lens of the design of lens 10f, and lens 10j is a substantially duplicate lens of the design of lens 10i. In this example, as lenses 10f and 10g, and 10i and 10j, are substantially duplicates, the primary, secondary, tertiary and quaternary zones of lenses 10f and 10g, and the primary, secondary, tertiary, and quarternary zones of lenses 10i and 10j serve the same function (i.e., clear vision region or defocus region). As a further example of the lenses illustrated in FIGS. 3A-3D, wherein the primary, secondary, tertiary and quaternary zones of lenses 10f and 10g, and the primary, secondary, tertiary, and quaternary zones of lenses 10i and 10j serve the different functions (i.e., clear vision region or defocus region), the set of lenses 10f, 10g, 10i and 10j comprises 4 different lenses each with a different lens design. In yet another example of the lenses illustrated in FIGS. 3A-3D, a set of four lenses wherein the clear vision regions and the defocus regions of lenses 10f and 10g, and of 10i and 10j, are located in the same zones in both lenses (i.e., in the primary zone, secondary zone, tertiary zone, or quaternary zone) but have different refractive powers. For example, the defocus region can comprise the secondary zone of lenses 10f, 10g, 10i and 10j, wherein the refractive power of the defocus regions of lenses 1 of and 10g are different from each other, and the refractive power of the defocus regions of lenses 10i and 10j are different from each other. Alternatively, wherein the functional regions (clear vision region and defocus region), the refractive powers (clear vision region refractive power and defocus region refractive power), or both the functional regions and refractive powers differ between lenses 10f, 10g, and 10h (FIG. 3A), and 10i, 10j, and 10k (FIG. 3B), the set comprises a set of six individual lenses 10f, 10g, and 10h (FIG. 3A), and 10i, 10j, and 10k (FIG. 3B).

As an additional example, the contact lens of the first set of contact lenses have a first aspheric power profile, and the contact lenses of the second set of contact lenses have a second aspheric power profile that is different than the first aspheric power profile.

As another example, the contact lenses of the first contact lens set and the second contact lens set can be different in reference to a transition region(s) between the different refractive power zones. As one example, contact lenses of the first set and contact lenses of the second set have different optical designs by have similar area ratios of the different zones.

As an another example, the contact lenses of the first set of contact lenses has the first refractive power in the center of the optic zone, and the contact lenses of the second set of contact lenses has the second refractive power in the center of the optic zone.

As another example, the contact lenses of the first set of contact lenses can have a different transition between the zone(s) having the first refractive power and the zones having the second refractive power compared to the transition provided on the contact lenses of the second set of contact lenses.

In yet another example, the first refractive power of the contact lenses of the second set of contact lenses has a power profile that is different than the power profile of the first refractive power of the contact lenses of the first set. In addition or alternately, the second refractive power of the contact lenses of the second set of contact lenses has a different power profile than the second refractive power of the contact lenses of the first set.

In an additional example, the contact lenses of the second set of contact lenses have a different amount of defocus in the zones of second refractive power compared to the amount of defocus in the zones of second refractive power of the contact lenses of the first set.

In yet another example, the contact lenses of the first set has multiple concentric rings of different refractive power and the contact lenses of the second set has a single zone.

In a still further example, the contact lenses of the second set of contact lenses have different lens parameters than the contact lenses of the first set. For example, a different base-curve, a different thickness, and/or a different lens diameter to improve vision through better fitting and/or better centration on the patient's eye.

As the present contact lenses can be provided in lens sets, as described herein, another aspect of the invention is directed to sets of contact lenses present, separately or together, in a package. The sets of contact lenses can be provided in secondary packaging containing individually packaged contact lenses, as described herein. The lens sets can be provided with a listing of characteristic information for each of the lenses present in the set which is used to determine which lens from the set to prescribe to a contact lenses wearer. In one example, the set of contact lenses further comprises a listing of the first lens central zone diameter and the second lens central zone diameter, and/or a listing of the first lens area ratio and the second lens area ratio. In another example, the set of contact lenses further comprises a listing of approximate pupil sizes correlated to each of the first and second contact lenses, and/or a listing of desired area ratios to provide to a contact lens wearer correlated to each of the first and second contact lenses.

Although the disclosure herein refers to certain specific embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the claims.

What is claimed is:

1. A method for slowing progression of myopia or hyperopia of a human patient, comprising:
  providing contact lenses, the contact lenses comprising a first set of contact lenses and a second set of contact lenses, so that a practitioner can select a contact lens from the second set of contact lenses based on a response of the patient to a contact lens of the first set of contact lenses after at least about 10 minutes of wearing the contact lens of the first set of contact lenses, wherein the response of the patient comprises an accommodative response, an axial ocular elongation measurement, a refractive error correction progression measurement, or a peripheral refraction measurement, or any combinations thereof, to provide an improved visual performance to a human patient wearing the second set of contact lenses compared to the visual performance of the human patient provided by the first set of contact lenses;

wherein the first set of contact lenses comprises at least two contact lenses, each contact lens comprising a first refractive power and a second refractive power, the second refractive power providing a defocused retinal image to a human patient at both near and far viewing distances when the contact lens is placed on the eye of the human patient, and wherein the second set of contact lenses comprises at least two contact lenses, each contact lens comprising a first refractive power and a second refractive power, the second refractive power providing a defocused retinal image to a human patient at both near and far viewing distances when the contact lens is placed on the eye of the human patient and effective to slow progression of myopia or hyperopia of the human patient, and the contact lenses of the second set have a different optical design than the contact lenses of the first set.

2. The method of claim 1, wherein the providing comprises providing the contact lenses from a contact lens manufacturer to a contact lens distributor, a contact lens retailer, or an eye care practitioner, or any combinations thereof.

3. The method of 1, further comprising providing said contact lenses to a human patient for the human patient to place the contact lenses on the eyes of the human patient.

4. The method of claim 1, further comprising prescribing the second set of contact lenses to the human patient.

5. The method of claim 1, wherein the improved visual performance provided by the second set of contact lenses comprises improved vision, improved visual acuity, improved visual quality, improved slowing of progression of myopia or hyperopia in patients who do not exhibit a sufficient slowing of progression of myopia or hyperopia when wearing the first set of contact lenses, or improved wavefront aberration profiles provided by the combination of the patient's eye and the contact lens located thereon, or any combinations thereof.

6. The method of claim 5, wherein the improved visual quality comprises a reduction in ghosting, an increase in contrast visual acuity, or a reduction in glare around lights, or any combinations thereof.

7. The method of claim 1, wherein the response of the patient is a response measured after at least 6 months of wearing the contact lens of the first set.

8. The method of claim 1, wherein the response is measured in only one eye, is measured in both eyes, or is measured in both eyes simultaneously.

9. The method of claim 1, wherein the second refractive power of a contact lens of the first set of contact lenses defines a first defocus region and the second refractive power of a contact lens of the second set of contact lenses defines a second defocus region, and the second defocus region has a different location, a different size, a different shape, a different dioptric value, or a different number of defocus regions, or any combinations thereof, compared to the first defocus region.

10. The method of claim 1, wherein the first refractive power of a contact lens of the first set of contact lenses defines a first vision correction region and the second refractive power of the contact lens of the first set of contact lenses defines a first defocus region, and the first refractive power of a contact lens of the second set of contact lenses defines a second vision correction region and the second refractive power of the contact lens of the second set of contact lenses defines a second defocus region, and the contact lens of the second set of contact lenses has a different area ratio of the second vision correction region to the second defocus region compared to the area ratio of the first vision correction region to the first defocus region.

11. The method of claim 1, wherein a contact lens of the first set of contact lenses and a contact lens of the second set of contact lenses each has an optical axis and the contact lens comprises (i) a central zone including the optical axis, the central zone providing the first refractive power and having a central zone diameter, and (ii) an annular zone adjacent to and circumscribing the central zone, the annular zone providing the second refractive power, and the central zone diameter of the contact lens of the second set is less than the central zone diameter of the contact lens of the first set.

12. The method of claim 1, wherein the first set of contact lenses comprises at least two identical contact lenses, the second set of contact lenses comprises at least two identical contact lenses, or both.

13. The method of claim 1, wherein the contact lens from the second set of contact lenses is selected based on a change of high contrast visual acuity or a low contrast visual acuity of the patient of at least 0.05 logMAR.

14. The method of claim 1, wherein the contact lens of the first set of contact lenses, or the contact lens of the second set of contact lenses, or combinations thereof, provide defocus along a central visual axis of the eye of the patient.

15. The method of claim 14, wherein the contact lens of the first set of contact lenses, or the contact lens of the second set of contact lenses, or combinations thereof, provide defocus at a location peripheral to the fovea of the retina of the eye of the patient.

16. The method of claim 1, wherein at least one contact lens of the first set of contact lenses, the second set of contact lenses, or both, comprises a single effective refractive power providing visual acuity.

* * * * *

UNITED STATES PATENT AND TRADEMARK OFFICE
CERTIFICATE OF CORRECTION

PATENT NO. : 8,899,746 B2  Page 1 of 1
APPLICATION NO. : 13/318630
DATED : December 2, 2014
INVENTOR(S) : Back et al.

It is certified that error appears in the above-identified patent and that said Letters Patent is hereby corrected as shown below:

Title page item (75)

"Inventor: Arthur Back, Danville, CA (US)" should read --Inventors: Arthur Back, Danville, CA (US) and Kuang-mon Ashley Tuan, Mountain View, CA (US)--.

Signed and Sealed this
Sixteenth Day of February, 2016

Michelle K. Lee
*Director of the United States Patent and Trademark Office*

UNITED STATES PATENT AND TRADEMARK OFFICE
CERTIFICATE OF CORRECTION

PATENT NO.         : 8,899,746 B2                                                    Page 1 of 1
APPLICATION NO.    : 13/318630
DATED              : December 2, 2014
INVENTOR(S)        : Back et al.

It is certified that error appears in the above-identified patent and that said Letters Patent is hereby corrected as shown below:

Title page

Item (12) should read --Back et al.--.

Item (75) "Inventor: Arthur Back, Danville, CA (US)" should read --Inventors: Arthur Back, Danville, CA (US) and Kuang-mon Ashley Tuan, Mountain View, CA (US)--.

This certificate supersedes the Certificate of Correction issued February 16, 2016.

Signed and Sealed this
Thirty-first Day of May, 2016

Michelle K. Lee
*Director of the United States Patent and Trademark Office*